MAGEE & TOWNE.
Ventilating Damper for Stoves.
No. 1,355. Reissued Nov. 18, 1862.
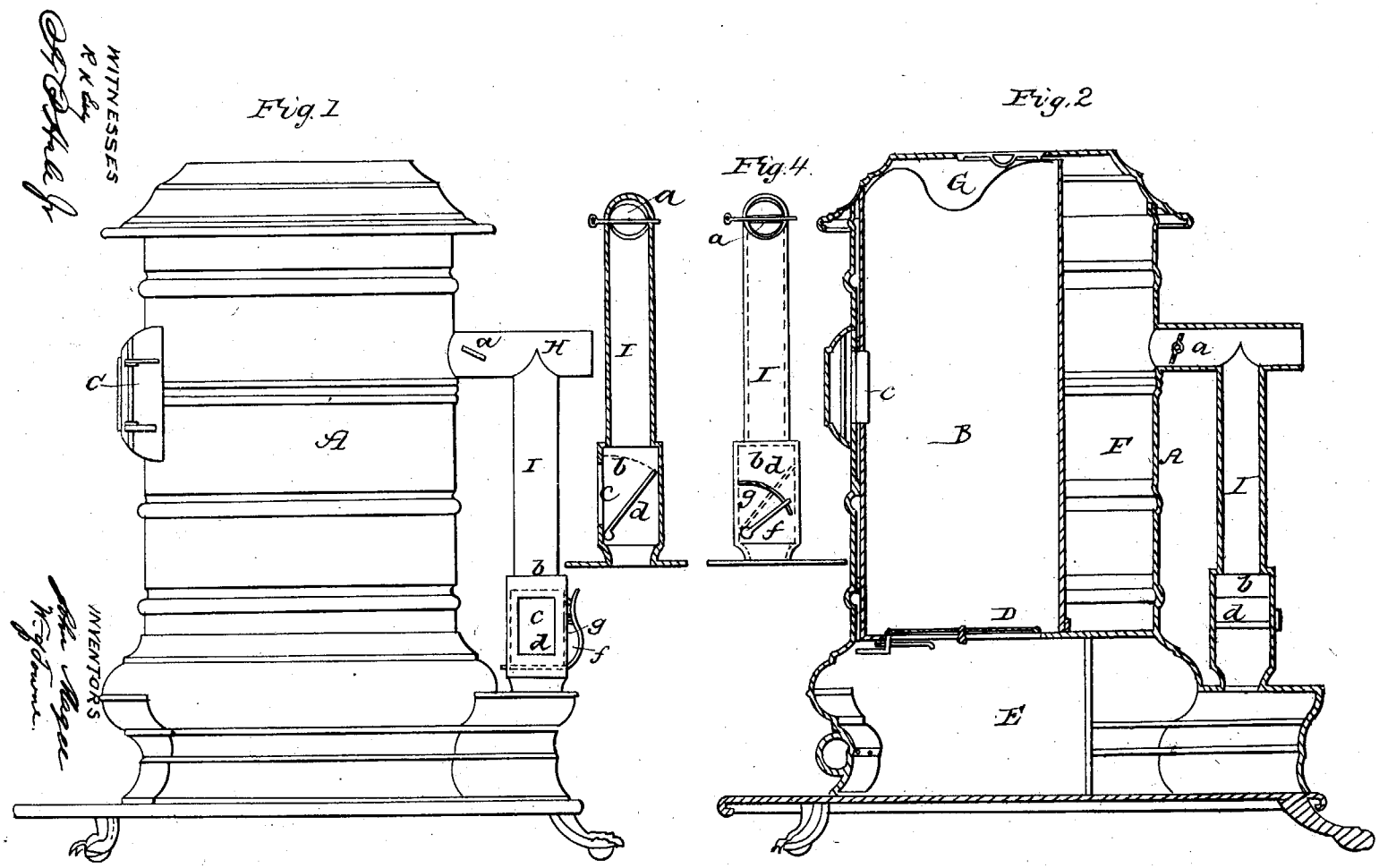
N. PETERS, Photo-Lithographer, Washington, D. C.

UNITED STATES PATENT OFFICE.

JOHN MAGEE, OF CHELSEA, AND WILLIAM J. TOWNE, OF NEWTON, MASSACHUSETTS, ASSIGNEES OF SAID JOHN MAGEE.

IMPROVEMENT IN VENTILATING DAMPERS FOR STOVES.

Specification forming part of Letters Patent No. 14,940, dated May 20, 1856; Reissue No. 1,355, dated November 18, 1862.

*To all whom it may concern:*

Be it known that we, JOHN MAGEE, of Chelsea, in the county of Suffolk, and WILLIAM J. TOWNE, of Newton, in the county of Middlesex and State of Massachusetts, assignees of Letters Patent No. 14,940, and bearing date the 20th day of May, A. D. 1856, (such patent being for an improvement in ventilating registers and dampers for stoves,) do hereby declare the said invention to be fully described in the following specification and represented in the accompanying drawings, of which—

Figure 1 exhibits a side elevation of a stove with our improvement applied to it; Fig. 2, a central, vertical, and longitudinal section of said stove; Fig. 3, a vertical section of the upright flue-pipe and the ventilating-damper, to be hereinafter described. Fig. 4 is a rear view of said pipe.

Our invention has especial reference to stoves constructed so as to have a downward draft.

In the said drawings, A denotes the main body or outer case of a stove having within it, and arranged concentrically therewith, the chamber of combustion B, provided not only with a fire-place opening and door, as seen at C, but with an ash-pit and a grate, as seen at D and E′. The said ash-pit and the said chamber of combustion are entirely separated from the surrounding space or chamber F, (formed within the case A,) except at the top of said chamber of combustion, where there are one or more openings, G, through which the smoke and volatile products of combustion can pass from the chamber B directly into the flue-space F. Out of the upper part of the said flue space F a horizontal discharge-pipe, H, is carried, as seen in Figs. 1 and 2, and is provided with a damper, *a*. By means of a vertical pipe, I, the lower part of the flue space F is connected with the pipe H in advance of the damper thereof, a portion, *b*, of said vertical pipe I being formed as a rectangular box provided with an opening, *c*, through one side of it. Within the box we arrange a door or damper, *d*, which is hinged at its lower end to that side of the box through which the opening *c* is made, said door being of a width to correspond with the width of the interior of the box, and of a length somewhat greater than the vertical length of the opening *c* and the horizontal width of the box *b*, it being intended that said door shall not only serve as a damper to regulate the flow of smoke through the vertical pipe I, but also, and at the same time, as a valve to regulate the admission of external air into the pipe I and through the opening *c*. The more the door or valve *d* is opened or turned inward the greater it will make the passage for the admission of air into the pipe or tube, and the more will it shut off or diminish the flow of the products of combustion into the pipe I. A contrary effect is produced in proportion as we may move the door *d* toward the opening *c;* and thus it will be seen that by means of said opening *c* and said door *d*, arranged in manner as set forth, we are enabled to accomplish peculiar effects.

It is not new to make a stove with a stand-pipe, I, connecting its downward flue or draft F with the main discharge-pipe and in advance of the damper thereof; nor is it new to have an opening either in the said upright pipe or in the downward draft flue for the purpose of admitting air into either of the same, and so as not only to ventilate a room or apartment, in which the stove may be placed, but also to diminish the draft. In such case the door of the opening has always been made either to slide over the opening or to open outward, and in no respect to operate as a damper for the purpose of interrupting more or less the flow of smoke through the stand-pipe or vertical discharge-flue, as it does in our improved arrangement of it. It has bee found in practice that although the opening for the admission of air may be very large it will not operate to good advantage so long as its door opens outward, as it affords little or no check to the draft, but rather tends to increase it. It should be observed that the purpose of the opening is to ventilate the room as well as to admit air into the flue in order to cool it and aid in checking the draft.

By having the door or valve to open inward and into the flue-pipe in accordance with our invention, it will be seen that such valve aids not only in checking the draft, but its opening or passage serves not only to ventilate the room, but to supply air to the flue-pipe.

In Figs. 1 and 4, *f* exhibits a spring-lever or handle extending from the damper *d* and on the outside portion *b* of the pipe I, and made to work into a notched rack or arc, *g*, and in such manner as to enable the damper to be moved and set or fixed either in a vertical or in such an inclined position as circumstances may require.

What we claim as our invention or improvement in the class of stoves and furnaces above described is—

The new combination of the damper *d*, Fig. 3, smoke-pipe I, and air-inlet *c*, so that the movement of the damper which diminishes the air-inlet will increase the opening of the smoke-passage, and that which increases the opening for the smoke will diminish the inlet for air, substantially in the manner and for the purposes above specified.

JOHN MAGEE.
WM. J. TOWNE.

Witnesses:
F. P. HALE, Jr.,
J. R. BAMFITON.